US011443769B2

(12) United States Patent
Kanevsky et al.

(10) Patent No.: US 11,443,769 B2
(45) Date of Patent: Sep. 13, 2022

(54) ENHANCING AUDIO USING MULTIPLE RECORDING DEVICES

(71) Applicant: Google LLC, Mountain View, CA (US)

(72) Inventors: Dimitri Kanevsky, Ossining, NY (US); Golan Pundak, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/194,827

(22) Filed: Mar. 8, 2021

(65) Prior Publication Data

US 2021/0193180 A1    Jun. 24, 2021

Related U.S. Application Data

(63) Continuation of application No. 16/812,760, filed on Mar. 9, 2020, now Pat. No. 10,943,619, which is a
(Continued)

(51) Int. Cl.
*G11B 20/10* (2006.01)
*G06F 3/16* (2006.01)
(Continued)

(52) U.S. Cl.
CPC .......... *G11B 20/10527* (2013.01); *G06F 3/16* (2013.01); *G06F 3/165* (2013.01);
(Continued)

(58) Field of Classification Search
CPC .... G11B 20/10527; G11B 2020/10546; G06F 3/16; G06F 3/165; G10L 17/00;
(Continued)

(56) References Cited

U.S. PATENT DOCUMENTS 8,972,262 B1    3/2015  Buryak
9,128,981 B1    9/2015  Geer
(Continued)

OTHER PUBLICATIONS

Benesty et al., "On Microphone-Array Beamforming From a MIMO Acoustic Signal Processing Perspective", in IEEE Transactions on Audio, Speech, and Language Processing, Mar. 2007, pp. 1053-1065.
(Continued)

*Primary Examiner* — Fan S Tsang
*Assistant Examiner* — David Siegel
(74) *Attorney, Agent, or Firm* — Byrne Poh LLP

(57) ABSTRACT

In general, the subject matter described in this disclosure can be embodied in methods, systems, and program products for identifying that a first audio stream includes first, second, and third sources of audio. A computing system identifies that a second audio stream includes the first, second, and third sources of audio. The computing system determines that the first and second sources of audio are part of a first conversation. The computing system generates a third audio stream that combines the first source of audio from the first audio stream, the first source of audio from the second audio stream, the second source of audio from the first audio stream, and the second source of audio from the second audio stream, and diminishes the third source of audio from the first audio stream, and the third source of audio from the second audio stream.

21 Claims, 6 Drawing Sheets

Related U.S. Application Data continuation of application No. 15/954,105, filed on Apr. 16, 2018, now Pat. No. 10,586,569, which is a continuation of application No. 14/856,270, filed on Sep. 16, 2015, now Pat. No. 9,947,364.

(51) Int. Cl.
| | | |
|---|---|---|
| *G10L 17/00* | (2013.01) | |
| *G10L 21/0364* | (2013.01) | |
| *H04M 3/56* | (2006.01) | |
| *G10L 25/51* | (2013.01) | |
| *G10L 21/0208* | (2013.01) | |
| *G10L 21/028* | (2013.01) | |
| *G10L 25/84* | (2013.01) | |

(52) U.S. Cl.
CPC .......... *G10L 17/00* (2013.01); *G10L 21/0364* (2013.01); *G10L 25/51* (2013.01); *H04M 3/56* (2013.01); *H04M 3/568* (2013.01); *G10L 21/0208* (2013.01); *G10L 21/028* (2013.01); *G10L 25/84* (2013.01); *G11B 2020/10546* (2013.01)

(58) Field of Classification Search
CPC . G10L 21/0364; G10L 25/51; G10L 21/0208; G10L 21/028; G10L 25/84; H04M 3/56; H04M 3/568
See application file for complete search history.

(56) References Cited

U.S. PATENT DOCUMENTS

| | | | |
|---|---|---|---|
| 2008/0235021 A1 | 9/2008 | Cross et al. | |
| 2009/0046139 A1 | 2/2009 | Cutler et al. | |
| 2009/0238377 A1 | 9/2009 | Ramakrishnan et al. | |
| 2012/0215519 A1 | 8/2012 | Park et al. | |
| 2013/0006619 A1 | 1/2013 | Muesch | |
| 2014/0254820 A1* | 9/2014 | Gardenfors | H04M 3/42221 381/80 |
| 2015/0149173 A1* | 5/2015 | Korycki | G10L 17/00 704/246 |

OTHER PUBLICATIONS

Henneke et al., "Towards Acoustic Self-Localization of Ad Hoc Smartphone Arrays", in Joint Workshop on Hands-free Speech Communication and Microphone Arrays, May 30-Jun. 1, 2011, pp. 127-132.

International Search Report & Written Opinion dated Nov. 2, 2016 in International Application No. PCT/US2016/043634.

Matheja et al., "A Dynamic Multi-Channel Speech Enhancement System for Distributed Microphones in a Car Environment", in Journal on Advances in Signal Processing, Month Unknown 2013, pp. 1-21.

Notice of Allowance dated Oct. 28, 2020 in U.S. Appl. No. 16/812,760.

Notice of Allowance dated Oct. 30, 2019 in U.S. Appl. No. 15/954,105.

Notice of Allowance dated Dec. 4, 2017 in U.S. Appl. No. 14/856,270.

Office Action dated Mar. 15, 2017 in U.S. Appl. No. 14/856,270.

Office Action dated May 15, 2019 in U.S. Appl. No. 15/954,105.

Office Action dated Jul. 9, 2020 in U.S. Appl. No. 16/812,760.

Pedamallu, Vamsynagh, "Microphone Array Wiener Beamforming with emphasis on Reverberation", Thesis Paper, Blekinge Institute of Technology, Jan. 2012, pp. 1-73.

Seltzer, Michael, L., "Microphone Array Processing for Robust Speech Recognition", Thesis Paper, Department of Electrical and Computer Engineering, Carnegie Mellon University, Jul. 2003, pp. 1-163.

Stein, Noah D., "Nonnegative Tensor Factorization for Directional Blind Audio Source Separation", in arXiv:1411.5010, Nov. 2014, 10 pages.

Sur et al., "Autodirective Audio Capturing Through a Synchronized Smartphone Array", in MobiSys' 14 Proceedings of the 12th Annual International Conference on Mobile Systems, Application, and Services, Jun. 2014, pp. 28-41.

Zhang et al., "Maximum Likelihood Sound Source Localization and Beamforming for Directional Microphone Arrays in Distributed Meetings", in IEEE Transactions on Mulitmedia, Apr. 2008, pp. 538-548.

* cited by examiner

ENHANCING AUDIO USING MULTIPLE RECORDING DEVICES

CROSS-REFERENCE TO RELATED APPLICATIONS

This application is a continuation of U.S. patent application Ser. No. 16/812,760, filed Mar. 9, 2020, which is a continuation of U.S. patent application Ser. No. 15/954,105, filed Apr. 16, 2018, which is a continuation of U.S. patent application Ser. No. 14/856,270, filed on Sep. 16, 2015, each of which is hereby incorporated by reference herein in its entirety.

TECHNICAL FIELD

This document generally relates to enhancing audio using multiple recording devices.

BACKGROUND

Mobile devices, such as laptop computers, tablets, or cellular telephones are often installed with microphones that enable audio recording. As an example, a cellular telephone may include a microphone and an accompanying program that enables audio recording by processing electrical signals received from the microphone to generate a stream of audio data. The recorded audio data may be provided to other application programs installed at the cellular telephone for processing or storing.

Recorded audio data may be provided for use in a variety of situations, for example as input to a voice-to-text transcription system or as input to a voice translation system. Enhancing the recorded audio data prior to providing the audio as an input to such systems improves the efficiency and accuracy of generated transcriptions and translations.

SUMMARY

This document describes techniques, methods, systems, and other mechanisms for enhancing audio using multiple recording devices. In general, the microphones of multiple different devices such as smartphones may be used to record a conversation. The recordings may be analyzed and the individual audio sources (e.g., people sources or noise sources) may be identified within each recording. A computing system may identify one or more of the audio sources as desirable, and may process the recordings to reduce or remove undesirable audio sources. The recordings with the undesirable audio sources removed may be combined to generate a recording with characteristics that are more-favorable than if just a single recording were used.

As additional description to the embodiments described below, the present disclosure describes the following embodiments.

Embodiment 1 is a computer-implemented method for enhancing audio. The method includes receiving, by a computing system, a first audio stream. The method includes identifying, by the computing system, that the first audio stream includes: (i) a first source of audio, (ii) a second source of audio, and (iii) a third source of audio. The method includes receiving, by the computing system, a second audio stream. The method includes identifying, by the computing system, that the second audio stream includes: (i) the first source of audio, (ii) the second source of audio, and (iii) the third source of audio. The method includes determining, by the computing system, that the first source of audio and the second source of audio are part of a first conversation to the exclusion of the third source of audio. The method includes generating, by the computing system, a third audio stream that: combines (a) the first source of audio from the first audio stream, (b) the first source of audio from the second audio stream, (c) the second source of audio from the first audio stream, and (d) the second source of audio from the second audio stream, and diminishes (a) the third source of audio from the first audio stream, and (b) the third source of audio from the second audio stream.

Embodiment 2 is the method of embodiment 1, wherein: the first audio stream was recorded by a cellular telephone; and the second audio stream was recorded by the laptop computer.

Embodiment 3 is the method of embodiments 1-2, further comprising providing, by the computing system, the third audio stream to a first device that recorded the first audio stream and to a second device that recorded the second audio stream, without providing the third audio stream to a device that recorded the third audio stream.

Embodiment 4 is the method of embodiments 1-3, wherein the computing system identifies that the first audio stream includes the first source of audio, the second source of audio, and the third source of audio as a result of the computing system or a device at which the first audio stream was recorded performing an audio decomposition algorithm; and wherein the computing system identifies that the second audio stream includes the first source of audio, the second source of audio, and the third source of audio as a result of the computing system or a device at which the second audio stream was recorded performing the audio decomposition algorithm or another audio decomposition algorithm.

Embodiment 5 is the computer-implemented method of embodiments 1-4, wherein a first ratio of an amplitude of the first source of audio in the first audio stream to the second source of audio in the first audio stream is different than a second ratio of an amplitude of the first source of audio in the second audio stream to the second source of audio in the second audio stream; and wherein a third ratio of the first source of audio in the third audio stream to the second source of audio in the second audio stream is different than the first ratio and is different than the second ratio.

Embodiment 6 is the computer-implemented method of embodiment 5, wherein the first audio stream further includes a fourth source of audio; and wherein the second audio stream further includes the fourth source of audio. The method further comprises identifying that the third source of audio and the fourth source of audio are part of second conversation to the exclusion of the first source of audio and the second source of audio. The method further comprises generating, by the computing system, a fourth audio stream that combines (a) the third source of audio from the first audio stream, (b) the third source of audio from the second audio stream, (c) the fourth source of audio from the first audio stream, and (d) the fourth source of audio from the second audio stream, and diminishes (a) the first source of audio from the first audio stream, (b) the first source of audio from the second audio stream, (c) the second source of audio from the first audio stream, and (d) the second source of audio from the second audio stream.

Embodiment 7 is the computer-implemented method of embodiments 1-6, wherein determining that the first source of audio and the second source of audio are part of the first conversation includes identifying, by the computing system, that the first source of audio is a person that is assigned to a first computing device at which the first audio stream was recorded; and identifying, by the computing system, that the second source of audio is a person that is assigned to a second computing device at which the second audio stream was recorded.

Embodiment 8 is the computer-implemented method of embodiments 1-7, wherein the computing system determines that the first source of audio and the second source of audio are part of the first conversation to the exclusion of the third source of audio, as a result of analysis of the first audio stream and the second audio stream.

Embodiment 9 is the computer-implemented method of embodiments 1-8, further comprising receiving user input that specifies that the first source of audio or the second source of audio are to be part of the first conversation.

Embodiment 10 is directed to a system including a one or more computer-readable devices having instructions stored thereon, the instructions, when executed by one or more processors, perform actions according to the method of any one of embodiments 1 to 9.

Particular implementations can, in certain instances, realize one or more of the following advantages. Multiple microphones may be used in combination to generate a recording of a conversation, while undesired audio sources may be removed from the recording of the conversation. There may be no need to pre-install a distributed group of microphones, and which devices are used to generate the recording may be dynamically selected as those the devices that are nearby. The system may use microphones from the distributed group of devices in locations at which pre-installed microphones may be difficult to set up, such as outdoor locations.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
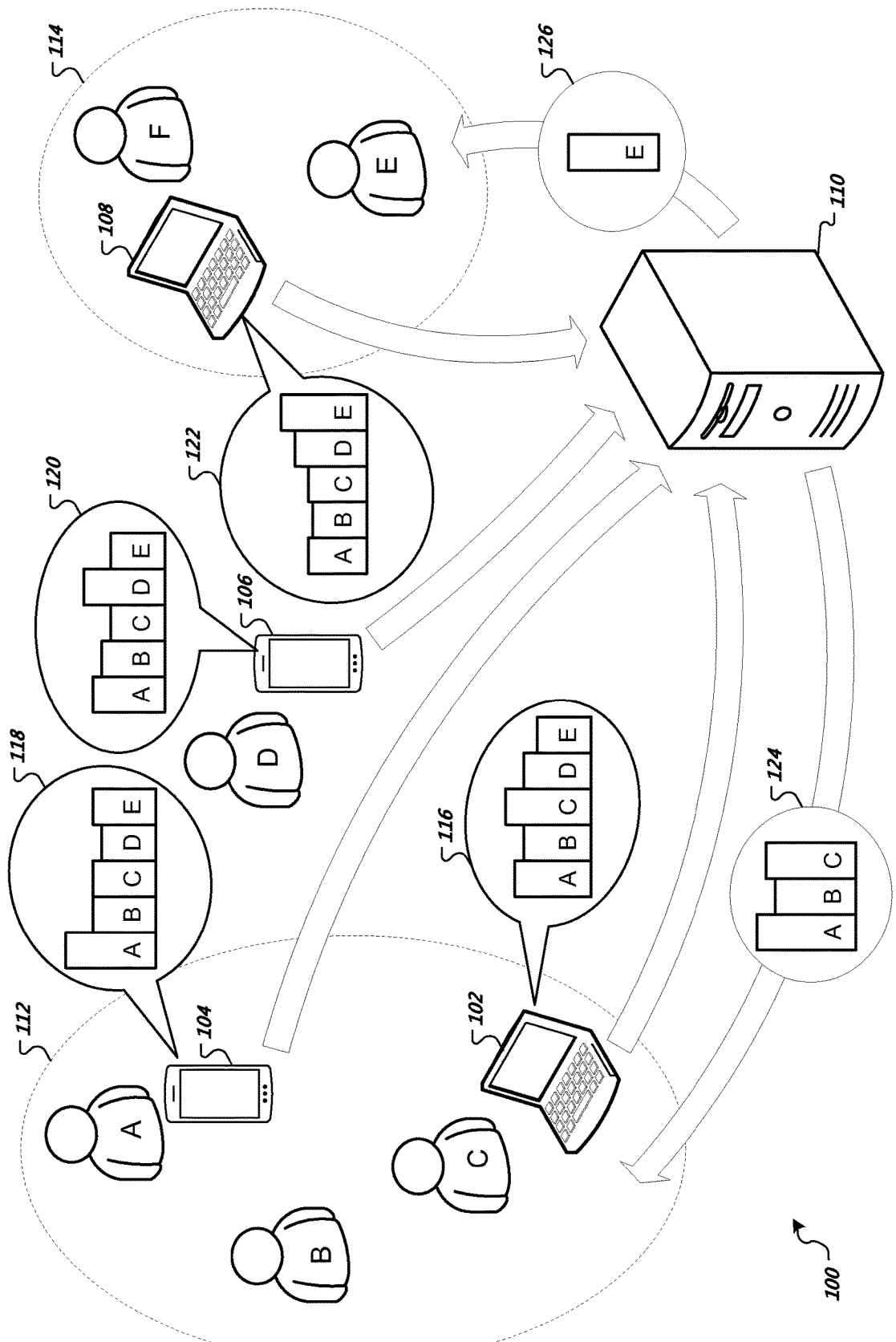
FIG. 1 shows a diagram that illustrates multiple users participating in various conversations and multiple devices recording those conversations.

This document generally describes enhancing audio using multiple recording devices. There are benefits to using a distributed set of microphones to record a conversation (e.g., to capture audio and stream it to applications or devices, with or without persistently storing the captured audio). For example, integrating audio streams from multiple microphones enables an audio-processing system to enhance the audio recording to offset problems like a weak signal (e.g., a person speaking softly or not being near a microphone) or noise (e.g., car engines or other individuals that are speaking in the vicinity). Using multiple microphones can help alleviate the above-described issues, but there may not be a pre-installed set of microphones at a location. Microphones from devices such as cellular telephones and laptop computers can be used to supplement or in place of pre-installed microphones in a system that generates an enhanced audio stream from a distributed group of microphones.

As an illustration, a group of individuals may desire to participate in a conversation in a large open space, such as in a cafeteria or at a park. This group may want to generate a recording of the conversation, for example, to provide as input to a voice-to-text transcription system, for transmission to another individual that is participating in the conversation remotely via a teleconference or a videoconference system, or to store for later reference. At least one member of the group (Tom in this example) may have a device on him that can record the conversation, such as a cellphone. Using this single device to create the recording, however, may have downsides. For example, Tom's cellphone may not have a high-quality microphone and may not be located near other members of the group that are participating in the conversation.

An enhanced-quality recording may be generated by using multiple devices to record multiple respective audio streams, where each device transmits its audio stream to a remote computing system for processing into the enhanced-quality recording. Enlisting other devices to participate in the collaborative recording can be performed in various manners. For example, Tom may start a recording (e.g., by pressing a record button on his phone or pressing a button to begin a teleconference) and a remote system may identify other phones or recording devices (e.g., laptop computers) that are nearby and enlist those other devices to record. Based on permissions set by users of those other devices, each other device could begin recording automatically without additional user input other than previous specification of a permission to permit automated recording (the device may provide an indication that it is automatically recording). Alternatively, other devices could present a prompt that requires user acknowledgement to permit recording. As yet another example, users of those other device may have to provide input to specify the recording to which the other device would collaborate. For example, the recording devices may not be automatically discovered, and users of the recording devices may have to request to participate in the recording on a web page or in an application program. In this example, Tom may have sent a request through an application program that Bob and Jill (other members of the conversation) permit their devices to record audio.

At this point, there may be multiple devices that are recording audio streams in a vicinity, including devices of users that are not participating in the conversation and just happen to be nearby. Each device may send its recording to an audio-processing system. This may be done by transmitting data that characterizes the recordings (e.g., a digital stream of values that can be used to create an audible reconstruction of a recording) via wired or wireless internet connections to the audio-processing system. The audio-processing system may be implemented by one or more computers (e.g., a set of geographically-dispersed servers).

The audio-processing system may identify the audio sources within each audio stream. In some examples, this is done through an algorithm that decomposes the signal into statistically uncorrelated factors, such as by use of a principle component analysis algorithm. In effect, the system may be considered to isolate each audio source (e.g., each speaker, group of speakers, or source of noise) within an audio stream. For example, the system may take an audio stream in which Tom is speaking at the same time as Bob is speaking and a radio is playing, and separate the audio stream (actually or mathematically) into separate audio streams, such as one audio stream that enhances Tom's speaking (decreasing other sounds), one audio stream that enhances Bob's speaking (decreasing other sounds), and one audio stream that enhances the radio (decreasing other sounds).

This identification of audio sources may be performed on each audio stream, and the audio-processing system may match identified audio sources in each audio stream to each other. In other words, the audio-processing system may determine that the sound of Bob in one audio stream is also the sound of Bob in another audio stream, and that the sound of the radio in one audio stream is the sound of the same radio in another audio stream (e.g., through analysis of the characteristics of the identified audio sources in each audio stream). Doing so permits the audio-processing system to combine the sounds of Bob in each audio stream into a single audio stream that benefits from the use of multiple microphones. The audio-processing system may perform the matching process by comparing the audio sources in each audio stream (referred to sometimes as factors of the audio stream) to the identified audio sources in other audio streams. Other information may also be used to identify which audio sources match each other, such as a determined location of the devices that are recording each audio stream. For example, a matching algorithm that compares decomposed audio sources to each other may weight more heavily and favor a match if two audio sources were derived from audio streams recorded at devices that were geographically close to each other. In other words, two similarly-sounding audio sources recorded at nearby devices are more likely to be matching audio sources than two similarly-sounding audio sources recorded at far away devices.

At this point, the audio-processing system may have audio information that was recorded at multiple respective devices and that identifies each of multiple different audio sources (e.g., people or sources of noise) at those devices. For example, the system may have identified a "Tom" audio source in audio signals recorded at devices A, B, and C, a "Bob" audio source in audio signals recorded at devices A, B, and C, and a "radio" audio source in audio signals recorded at devices A, B, and C. The system may combine aspects of different audio signals to enhance certain audio sources and decrease or filter out other audio sources. The combination of audio sources may be performed in various manners, such as through array processing in which certain audio sources from multiple audio streams are summed together (and others are subtracted). The system may delay one or more of the audio sources from the multiple audio streams so that the audio sources are aligned before summing (e.g., to obviate any delay in recording due to the recording devices being located at different distances from the audio source).

The identification of which audio sources to enhance and which to decrease may be performed in multiple ways. Stated another way, there are multiple ways for the computing system to determine which audio sources are desirable and part of a conversation, and which are noise. In some examples, each of the recording devices may be assigned to or associated with an account of a user, and that account may include voice data that characterizes the user (which may be stored only in response to user authorization). With such a configuration, the system may be able to identify that one of the audio sources sounds like a user of one of the audio-recording devices, and therefore may designate that user as an audio source to include in the enhanced audio stream. Someone that is walking by and that speaks with a voice that does not match an owner of any of the recording devices may be filtered out because that person is more likely to be noise.

In some examples, the audio-processing system analyzes one or more of the recorded audio streams to identify which people are part of the conversation. This may be done by identifying which people take turns speaking. For example, there may be ten people in a room in which eight devices are recording. Of the ten people, five may be a first conversation (identified because the five take turns speaking), three may be in a second conversation (identified because the three take turns speaking), and two people may be alone and speaking on the phone or speaking to themselves out loud (identified because the three speak at the same time as other individuals). In some examples, the audio-processing system analyzes the location of devices to identify which individuals may be part of a conversation. Building off of the last example, the system may be able to identify that five of the recording devices are geographically near each other using GPS, and that another two are near each other using GPS. The system may determine that sounds coming from the owners of these grouped devices (e.g., determined as the loudest sound at each device, or determined based on previously-recorded voice models that link user sounds to a user account for a device) are part of a single conversation. The location of recording devices may be used in combination with the delay between sound from an audio source reaching recording devices at different times, in order to estimate the location of audio sources. The estimated location of audio sources can be used to determine whether an audio source is located near other audio sources and part of a conversation, or is located away from such other audio sources and not part of the conversation.

In some examples, the audio-processing system monitors audio streams and designates specific individuals as being part of a conversation as a result of those individuals stating a certain hotword (e.g., a word or phrase associated with the conversation, for example, a word that was displayed by a device at which a user initiated the recording and that triggers participation in the conversation). In some examples, the audio-processing system determines which individuals are discussing the same subject in order to assign those individuals to a single conversation (where the analysis of the conversation may occur only with user authorization). In some examples, the audio-processing system analyzes one or more pictures or videos captured from the location, for example, from a camera of a recording device, to identify which people are near a device and part of a conversation. In some examples, a user can specify with user input which audio sources are part of the conversation, for example by selecting individuals in an application.

With knowledge that a group of individuals is part of a conversation, the audio-processing system is able to generate a stream of audio that combines information from multiple audio streams, but that reduces or filters out from each of those multiple audio streams sounds that are not part of the conversation. For example, suppose that Tom, Bob, and Jill are having a conversation, with the radio playing in the background and another person (Susan) talking to her friend (Mary) nearby. The audio-processing system may receive audio recordings from Tom and Bob's mobile devices, and may process the audio in order to enhance audio from Tom, Bob, and Jill's conversation, and filter out audio produced by the radio, Susan, and Mary.

The audio-processing system may use more of the decomposed portion of the recording from Tom's phone when Tom speaks (because Tom's phone is near him and thus records his voice with greater volume) than the decomposed portion of the recording from Bob's phone when Tom speaks (although part of the recording from Tom's phone may still be used). Similarly, the audio-processing system may use more of the decomposed portion of the recording from Bob's phone when Bob speaks (because Bob's phone is near him and thus records his voice with greater volume) than the decomposed portion of the recording from Tom's phone when Bob speaks. On the other hand, Jill may be located roughly between Tom's phone and Bob's phone. Thus, when Jill speaks, the audio-processing system may use roughly an equal amount or level of the decomposed portion of her speaking from the recording by Tom's phone and an equal amount or level of the decomposed portion of her speaking from the recording by Bob's phone.

The audio-processing system may be able to perform various operations with the audio stream that is generated from multiple recording devices. In some implementations, the newly-generated recording may be stored by the audio-processing system or provided to another system for storage, for example, in response to user input that specified that the recording was to be stored for later listening. In some implementations, the generated audio stream may be provided to a transcription service (either computer-performed or human-performed), to generate a text transcription of the conversation by Tom, Bob, and Jill. In some examples, the generated audio stream may be provided to a computing device of an individual that is participating in an audio or video teleconference with Tom, Bob, and Jill.

The audio streams recorded by the distributed collection of recording devices can be filtered differently for different audiences. As a simple example, suppose that the audio-processing system is receiving audio streams from Tom, Bob, and Susan's mobile devices. When the audience is Bob, Tom, Jill, or someone on a call with one of those individuals, the audio-processing system may filter out sounds by the radio, Susan, and Mary. When the audience is Susan, Mary, or someone on a call with Susan and Mary, the audio-processing system may filter out sounds by the radio, Tom, Bob, and Susan. In other words, audio streams from a same period of time and from a same or overlapping set of recording devices (e.g., a same 10 ms slice of audio recordings from each of the recording devices) may be processed differently for different audiences. This can result in multiple concurrently-created audio streams from the same or an overlapping set of recording devices, but with different speakers (e.g., completely different or an overlapping set of different speakers) for each audio stream.

In some implementations, the computing system monitors a geographical location of each of the recording devices and automatically (e.g., without user input) stops recording or stops using an audio stream generated by a particular recording device in response to determining that the recording device has moved a determined distance away from other computing devices that are recording the conversation (e.g., because a user has left the room with his phone).

In some implementations, the computing system generates the new audio stream by using enhancements and filters that are recalculated on a regular basis (e.g., every 10 ms). As such, as sources of noise change volume, or as recording devices are moved around, the weightings applied to enhance or filter out certain audio sources in each audio stream may be recalculated.

Further description of techniques and a system for enhancing audio using multiple recording devices is provided with respect to the figures.

FIG. 1 shows a diagram that illustrates multiple users participating in various conversations and multiple devices recording those conversations. Suppose that individuals A-F are gathered in a large open space 100, such as a cafeteria, conference room or a park. Each of the individuals A-F may own, or otherwise be associated with, a mobile device that is capable of audio recording. For example, person C may be a user of laptop computer 102, person A may own cellular telephone 104, person D may own cellular telephone 106, and person F may be a user of laptop 108. In other examples, the one or more devices 102, 104, 106 and 108 may be other devices capable of audio recording, e.g., any device installed with a microphone.

The one or more devices 102, 104, 106, and 108 may be further configured to perform operations associated with audio recording. For example, a device may include settings that enable automatic audio recording. Automatic audio recording may be triggered using a voice recognition or hotword recognition system installed on the device. In other examples, a device may be configured to provide users with a prompt, such as a text message or an application notification that invites a user to begin an audio recording. In some examples, each of the recording devices may be assigned to or associated with a user account that includes a voice model that characterizes the user (where the voice model may be stored only with user authorization). The voice model may be used in conjunction with a voice recognition system in order to identify a source of audio as a user of an audio-recording device, and to subsequently designate that user as part of a group and an audio source to include in an enhanced audio stream. Identifying groups of users is described in more detail below with reference to FIG. 2.

The open space 100 may include a considerable amount of background noise. For example, the open space 100 may be a cafeteria, where a group of individuals may gather during a lunch break. In such an example, an audio recording device may be exposed to a variety of unwanted background noises, including conversations between people at neighboring tables, a background source of music, the sounds associated with the ordering, paying, and eating of food items. In other examples, the open space 100 may be a large conference room, where a group of individuals may be participating in an impromptu meeting. In such an example, an audio recording device may also be exposed to a variety of unwanted background noises, including the opening and closing of doors, or outdoor sounds coming from an open window such as passing traffic. In addition, the geometry of the open space 100 may enhance unwanted background noises or otherwise affect an audio recording, for example due to reverberations.

The individuals A-F may be participating in various conversations in the large open space 100. For example, individuals A, B and C may be participating in conversation 112, whilst individuals F and E are participating in conversation 114. Some individuals may be participating in conversations with people that are not gathered in the open space 100. For example, person D may be using his/her cellular telephone 106 to converse with someone, or may be thinking out loud and speaking to himself.

One or more members of conversations 112 and 114 may wish to generate a recording of the conversation in which they are participating. For example, person A may start an audio recording of conversation 112 using device 104. A user of a device may start an audio recording by, for example, pressing a record button on the device or pressing a button to begin a teleconference. Upon starting an audio recording, nearby devices capable for audio recording may be identified by a remote system, and enlisted for recording. For example, upon person A starting an audio recording of conversation 112 using device 104, devices 102 and 106 may also begin recording.

The mobile devices 102, 104, 106, and 108 may be configured to identify and keep a record of their location upon starting an audio recording, for example using GPS, Wi-Fi or cellular tower identification, or a beaconing system. The identified location may be used in order to determine when to terminate an audio recording. For example, a mobile device may identify its location as a conference room. If the location of the device changes significantly, i.e., the location moves a distance further than a predetermined threshold or moves to a geographical space with different dimensions, for example if a user of the device were to leave the conference room with the mobile device for some reason, the device may terminate or pause the audio recording. Similarly, if the user of the device returned to the conference room with the mobile device, the device may resume audio recording. In some implementations the device may also allow for user input to terminate, pause or resume an audio recording. For example, a user may specify that a cellular telephone pause audio recording if the cellular telephone receives a telephone call, or that the keypad volume of a cellular telephone be turned off if a user writes a text message or email whilst the cellular telephone is recording. The location may also be used to determine whether users associated with the recording devices are near each other and thus more likely to be part of the same conversation.

The identified locations may also be used to provide some context to an audio recording. For example, a mobile device may determine that it is located in a park nearby an open field or nearby a highway, or that it is located in the corner of a conference room with a specific geometry that induces reverberations.

Each of the one or more devices 102, 104, 106 and 108 are configured to make audio recordings 116, 118, 120, and 122, respectively, and send the audio recording to audio-processing system 110. The audio recordings 116, 118, 120 and 122 include one or more factors that are dependent on the surroundings of the devices. For example, audio recording 116 made by device 102 includes factors that correspond to the sounds made by each of the individuals A-F. Since audio recording 116 is a recording of conversation 112, of which persons A, B and C are participating, the weighting or strength of factors A, B, C in the recording are stronger than that of factor E. The relatively high weighting of factor D may be due to the close proximity of person D to the recording device 102. Conversely, the weighting of factors A, B, and C in audio recording 122 is weaker than that of factor E, since device 108 is farther from individuals A, B, and C. The one or more factors that are dependent on the surroundings of the devices may also include one or more factors relating to background noise. In FIG. 1, person F is illustrated as owning device 108 that is enabled for audio recording, but is not actively participating in conversation 114 at the moment (even though the figure shows him as participating in the conversation).

The audio recordings 116, 118, 120, and 122 are sent to the audio-processing system 110 for processing. The audio-processing system 110 processes each of the audio recordings to generate an enhanced audio recording. For example, the audio-processing system may receive audio recordings 116, 118, 118, 120, and 122, and may use the recordings to generate an enhanced audio recording 124. In some implementations, audio-processing system 110 may also use additional information to generate the enhanced audio recording 124, such as contextual information. For example, if it is determined that audio device 102 is located near a field of cows, audio-processing system 110 may readily identify the received factor relating to the sound of the cows, and reduce the sound as appropriate in the enhanced recording. In another example, if it is determined that audio device 102 is located in a corner of a large conference room that is susceptible to reverberations, audio-processing system 110 may readily apply appropriate filters to reduce the distortion of the audio stream due to the reverberations.

The audio-processing system 110 sends the enhanced audio recordings to one or more of the devices 102, 104, 106 and 108. For example, the audio processing system 110 may send enhanced audio recording 124 to each of the devices that are recording the conversation 112. The enhanced audio recording 124 includes factors that correspond to the sounds made by each of the individuals A-C. The factors that correspond to the sounds made by persons D and E have been reduced, or removed entirely. Similarly, the factors that correspond to background or other unwanted noise may have been reduced or removed entirely. The enhanced audio recording 126 includes a factor that corresponds to the sounds made by person E, and the factors that correspond to sounds made by persons A-D have been reduced or removed entirely.

The enhanced audio recordings 124 and 126 may be stored at one or more of the devices 102, 104, 106, and 108, and/or provided for further use, for example as input to a voice-to-text transcription systems, or for transmission to another individual that wishes to participate in the conversation remotely.

Figure 2:
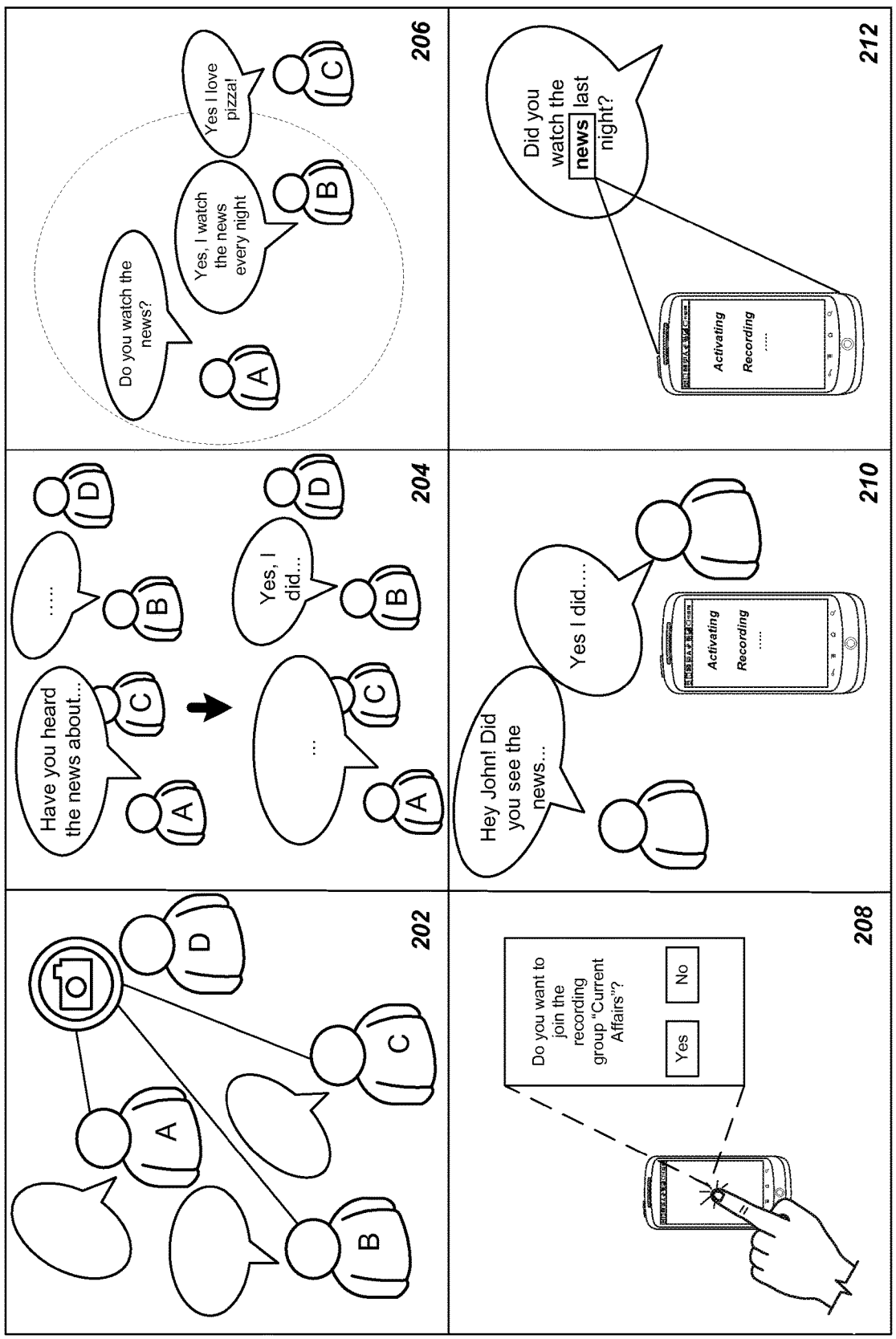
FIG. 2 shows a diagram that illustrates how to identify groups of users.

FIG. 2 shows a diagram that illustrates how to identify groups of users from amongst a group of individuals.

At box 202, the audio-processing system identifies a group of users by analyzing one or more pictures or videos captured of a location in which a group of individuals are gathered using a camera or other recording device. For example, a user of a cellular in the group of individuals, such as user D, may capture a video recording of the local vicinity using a camera on their cellular telephone. In some implementations, user D may capture a video recording of the local vicinity with the purpose of providing the video recording to the audio-processing system for identification of the group of users A, B, and C. In other implementations, user D may capture a video recording of the local vicinity for other reasons, for example to capture a video of user A performing a trick or to capture a recording of the environment in which the group of individuals are gathered, for personal amusement. Based on permission settings set by user A, the cellular telephone may automatically analyze the video recording to identify a group of users without additional user input other than the previous specification of the permission. The system may be configured to only identify individuals in the recording that have provided permission to allow such identification. Alternatively, the cellular telephone could present a prompt to user A that requires user A to permit analysis of the video recording. In some examples, the audio-processing system performs a face-recognition process on a picture or video to identify a user, and identifies a voice model associated with the recognized user. Doing so can enable the computing system to flag a particular source of audio (e.g., a speaker in a recording) as being part of a conversation because that user was captured in a picture taken by the recording device or another nearby device.

At box 204, the audio-processing system identifies a group of users by keeping a record of whether a group of users take turns speaking. For example, there may be four people, persons A, B, C, and D, in a room in which multiple devices are recording. Of the four people, persons A and B may be having a first conversation and persons C and D may be alone and speaking on the phone or speaking to themselves out loud. The audio-processing system may process the recordings from the multiple devices and determine that persons A and B take turns speaking, and determine that persons C and D speak at the same time as the other people. The audio-processing system may therefore identify persons A and B as a group of users.

At box 206, the audio-processing system identifies a group of users by determining whether people are speaking about the same subject. The audio-processing system may determine which individuals are discussing a same subject, such as the news, and assign those individuals to a single conversation. For example, the audio-processing system may determine that persons A and B are both speaking about the news, whereas person C is speaking about pizza, and assign persons A and B to a single conversation In some implementations, the audio-processing system may also identify that the mobile devices of persons A and B are geographically near each other using GPS, and may use this information when assigning persons A and B to the single conversation. For example, if a fourth person across the room happened to be discussing the news with a caller on his mobile device at the same time that persons A and B are discussing the news, the audio-processing system may determine that the fourth person is located too far away from persons A and B to be included in the conversation.

At box 208, the audio-processing system identifies a group of users by determining whether people provide user input on a device touchscreen to label themselves as members of a same group. For example, a user of a mobile device can manually provide user input to label themselves as a member of a same group by initiating an audio recording. In other examples, a user of a mobile device may initiate an audio recording, and may additionally specify with user input which audio sources in the vicinity are part of the group by selecting individuals in an application. Continuing the example, based on permissions set by the selected individuals, mobile devices belonging to the selected individuals can present prompts that require user acknowledgement to join or be included in a group. For example, a user may receive a text message or email including a user-selectable link that enables the user to join the group and begin an audio recording. In other examples, the user may receive an application invite request to join the group and begin an audio recording. As illustrated in box 208, the user may also receive a notification inviting the user to specify whether they wish to join the group or not. Each of the specified users may be associated with a sound model so that the system can identify a source of audio in a recording to a user specified as being part of a conversation.

At box 210, the audio-processing system identifies a group of users using voice recognition. For example, a mobile device may be assigned to or associated with an account of a user, and that account may include voice data that characterizes the user. The mobile device may be configured to monitor a received audio stream, and upon recognizing a voice of a user, identify the user as a member of the group of users that are participating in a conversation. In some examples, the identified user may manually provide user input to the device specifying that upon recognizing their speech, the device is to identify the user as part of the group (e.g., a user-identified group) of users, and begin an audio recording. In other examples, a collection of devices may include voice data that characterizes several users, and may identify several users as part of the group of users participating in the conversation upon recognizing their voices.

At box 212, the audio-processing system identifies a group of users by determining whether people say a same hotword. For example, the audio-processing system may monitor received audio streams and identify a group of users as being part of a conversation as a result of those individuals stating a certain hotword. The hotword can be a word or phrase that is associated with a conversation, such as "news" or "conversation 781." The hotword may be specified at a device at which a user initiates a recording, for example a user may initiate a recording at a mobile device and that device may specify that a certain hotword is to be stated for users to become members of the conversation (which may also cause the mobile devices of those joining members to begin recording without further user input). In other examples, a conversation hotword may be predetermined and mobile devices may identify groups of users and initiate audio recordings automatically upon recognizing the predetermined hotword.

The above-described mechanisms for identifying users of conversations may be performed only with user authorization. For example, users may not be able to be identified and designated as part of a conversation without having previously provided permission to be designated as part of a conversation. In some examples, a contributor to a conversation may be designated as part of a conversation without the computing system associating that contributor with a previously-determined user account (e.g., the system may simply identify that a speaker in a recording by a first device sounds like a speaker in a second device that is geographically nearby the first device).

Figure 3A:
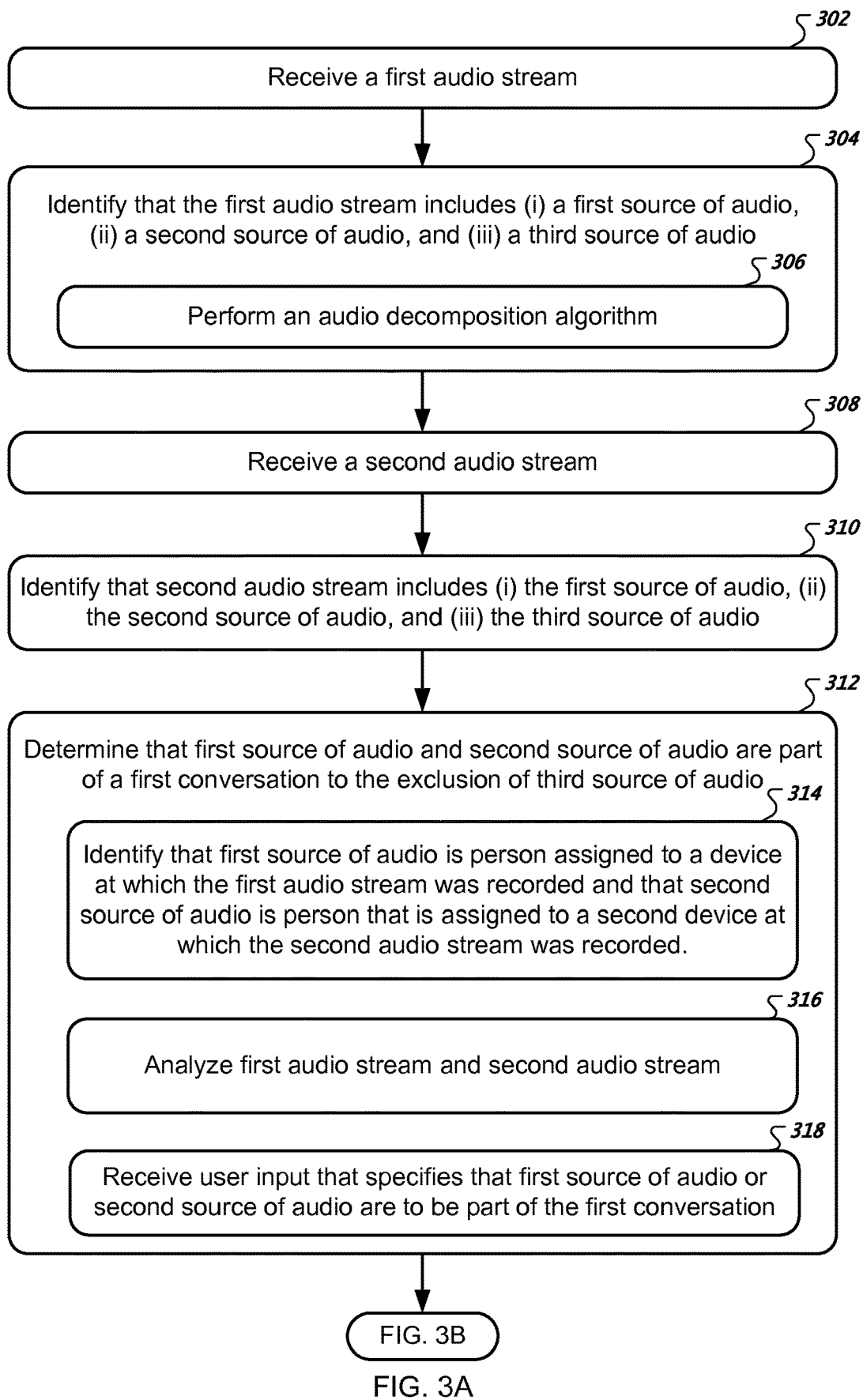
FIGS. 3A-3B show a flowchart that describes a process for enhancing audio using multiple recording devices.
Figure 3B:
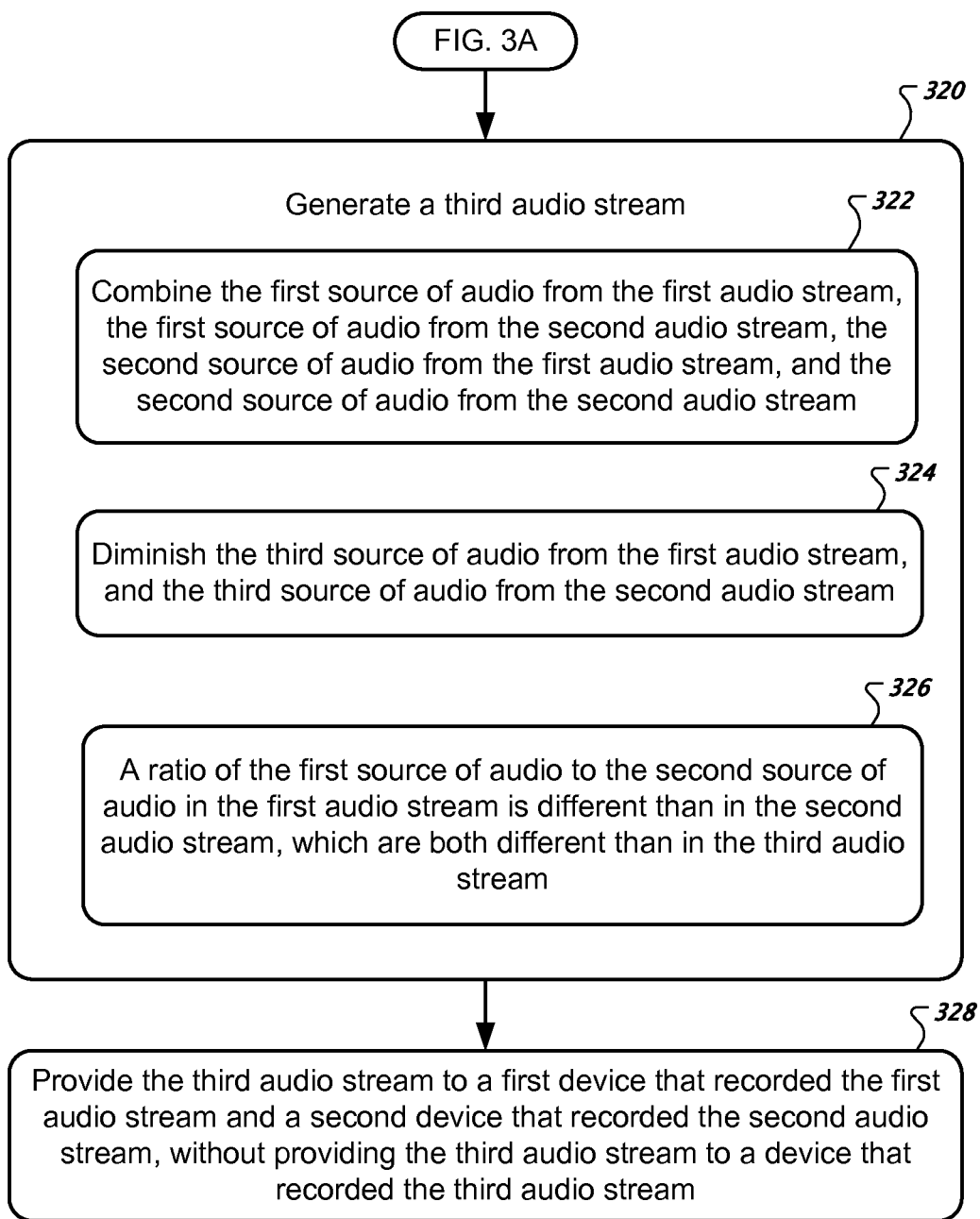

FIGS. 3A-3B show a flowchart of a process for enhancing audio using multiple recording devices.

At box 302, the computing system receives a first audio stream. In some implementations, the first audio stream may be an audio stream that was recorded by a cellular telephone. For example, the computing system may receive an audio stream from a cellular telephone 104 belonging to or otherwise associated with a person A (FIG. 1).

At box 304, the computing system identifies that the first audio stream includes (i) a first source of audio, (ii) a second source of audio, and (iii) a third source of audio. For example, the computing system may identify that the first audio stream received from the cellular telephone 104 includes speech from person A, speech from person C (who is near to person A), and an additional source of noise, such as a passing car engine (FIG. 1).

At box 306, the computing system performs an audio decomposition algorithm. In some implementations, the computing system identifies that the first audio stream includes the first source of audio, the second source of audio, and the third source of audio, as described above with reference to box 304, as a result of the computing system or a device at which the first audio stream was recorded performing an audio decomposition algorithm. For example, the computing system may perform an audio decomposition algorithm that decomposes the received first audio stream into statistically uncorrelated factors, such as a principle component analysis (PCA) algorithm. For example, the computing system may separate the received first audio stream into separate audio streams that correspond to each of the identified sources of audio, such as an audio stream in which person A is speaking, an audio stream in which person C is speaking, and an audio stream in which the car engine noise can be heard. In some examples, the system may separate the received first audio stream into separate, enhanced, audio streams, such as an audio stream that enhances person A's speaking, an audio stream that enhances person C's speaking, and an audio stream that enhances (or reduces) the car engine. Other example algorithms for separating an audio stream into its separate audio sources includes those described in "Nonnegative Tensor Factorization for Directional Blind Audio Source Separation," by Noah D. Stein, dated Nov. 19, 2014, which is incorporated herein in its entirety.

At box 308, the computing system receives a second audio stream. In some implementations, the second audio stream may be an audio stream that was recorded by a laptop computer. For example, the computing system may receive an audio stream from a laptop 102 belonging to or otherwise associated with person F (FIG. 1).

At box 310, the computing system identifies that the second audio stream includes (i) the first source of audio, (ii) the second source of audio, and (iii) the third source of audio. For example, the computing system may identify that the second audio stream received from the laptop 128 includes speech from person A, speech from person B, and the sound of the passing car engine (FIG. 1). In some implementations, the computing system may identify that the second audio stream includes the first source of audio, the second source of audio, and the third source of audio as a result of the computing system or a device at which the second audio stream was recorded performing the audio decomposition algorithm or another audio decomposition algorithm, as described above with reference to box 306.

At box 312, the computing system determines that the first source of audio and the second source of audio are part of a first conversation to the exclusion of the third source of audio. For example, the computing system may determine that person A and person C are conversing with each other, whilst the sound of the passing car engine is not a part of the conversation between person A and person C using, for example, the techniques discussed with reference to FIG. 2 and throughout this disclosure. In other examples, the third source of audio may be an additional person, say person D or F, and the computing system may determine that person D or F is not included in the conversation taking place between person A and person C. In further examples, the third source of audio may be passing traffic, cows in a nearby field, or the sound of a door opening and closing.

At box 314, the computing system identifies that the first source of audio is a person that is assigned to a first computing device at which the first audio stream was recorded, and identifies that the second source of audio is a person that is assigned to a second computing device at which the second audio stream was recorded. For example, the computing system may identify that person A is assigned to the cellular telephone 104, e.g., the cellular telephone 104 belongs to person A, and that person C is assigned to the laptop computer 102, e.g., person C is a user of the laptop computer 102 (FIG. 1).

At box 316, the computing system analyzes the first and second audio streams. In some implementations, the computing system determines that the first source of audio and the second source of audio are part of the first conversation to the exclusion of the third source of audio, as a result of the analysis of the first audio stream and the second audio stream. For example, the computing system may identify that person A and person C are taking turns in speaking, unlike the sound of the passing car engine. In another example, the computing system may analyze the first and second audio streams to identify respective locations of the devices that recorded the first and second audio streams and use the locations of the devices to determine that person A and person C are conversing. In further examples, the computing system may analyze the audio streams, in some cases with additional information such as location information relating to the surroundings of the devices that recorded the audio streams, in order to identify background sources of noise.

At box 318, the computing system receives user input that specifies that the first source of audio or the second source of audio are to be part of the first conversation. For example, person A may specify he/she is conversing with person C by selecting person C in an application on the cellular telephone 104. Identifying groups of users that are participating in a conversation is described in more detail above with reference to FIG. 2.

At box 320, the computing system generates a third audio stream. For example, with knowledge that one or more individuals are part of a conversation, the computing system may generate an audio stream that combines information from multiple audio streams, but that reduces or filters out from each of the multiple audio streams sounds that are not part of the conversation. For example, the computing system may use information about the environment in which the first and second audio streams have been recorded in, and use this information to reduce or filter out sounds that are not part of the conversation, and to enhance the quality of sounds that are part of the conversation. This process can remove reverberations or echoes as appropriate. The process can remove noise from audio. For example, if ten recording devices are far apart from each so they don't hear each other, but there may be a strong noise source that all are exposed to. The average noise source can be subtracted from the audio captured by each device to eliminate the noise. The cancelling of noises, combining of audio from multiple microphones, and reduction of echos can use various processes, such as those discussed in the following documents, which are incorporated by reference in their entirety: (1) "Microphone Array Processing for Robust Speech Recognition" by Michael L. Seltzer, which was submitted to the Department of Electrical and Computer Engineering at Carnegie Mellon University in July 2003, and (2) "On Microphone-Array Beamforming From a MIMO Acoustic Signal Processing Perspective," by Jocab Benesty et al., IEEE Transactions on Audio, Speech and Language processing, Vol. 15, No. 3, March 2007 at page 1053.

At box 322, the computing system combines (a) the first source of audio from the first audio stream, (b) the first source of audio from the second audio stream, (c) the second source of audio from the first audio stream, and (d) the second source of audio from the second audio stream. For example, the computing system may determine that the sound of person A in the first audio stream is also the sound of person A in the second audio stream, and that the sound of person B in the first audio stream is also the sound of person B in the second audio stream. The computing system may then combine the respective sounds of person A and person B into single audio streams. The computing system may use matching algorithms to identify audio sources that match each other, as well as other information such as a determined location of the devices that are recording the audio streams. For example, a matching algorithm that compares decomposed audio sources to each other may weight more heavily and favor a match if two audio sources were derived from audio streams recorded at devices that were geographically close to each other. In other words, two similarly-sounding audio sources recorded at nearby devices are more likely to be matching audio sources than two similarly-sounding audio sources recorded at far away devices.

At box 324, the computing system diminishes (a) the third source of audio from the first audio stream, and (b) the third source of audio from the second audio stream. For example, the system may generate an audio stream that reduces or filters out the sound of the passing car engine in order to generate an enhanced recording of the conversation taking place between person A and person C. In other examples, the computing system may reduce or filter out the sound of a person speaking with a voice that does not match an owner or user of a device that is used for recording.

In some implementations, a first ratio of an amplitude of the first source of audio in the first audio stream to the second source of audio in the first audio stream is different than a second ratio of an amplitude of the first source of audio in the second audio stream to the second source of audio in the second audio stream; and a third ratio of the first source of audio in the third audio stream to the second source of audio in the second audio stream is different than the first ratio and is different than the second ratio, as shown at box 326. These different ratios show that the computing system generates an output audio stream with a ratio of amplitudes that are different than the ratio of amplitudes of the input streams, for example, because it combined the input streams and modified the strengths of the audio sources relative to each other so each desired audio source would have a similar amplitude (and thus be about the same level of strength).

At box 328, the computing system provides the third audio stream to a first device that recorded the first audio stream and to a second device that recorded the second audio stream, without providing the third audio stream to a device that recorded the third audio stream. For example, having determined that person A is conversing with person C, the computing system may provide an enhanced audio stream to the cellular telephone 104 and laptop computer 102. The enhanced audio stream may be stored on the devices 102 or 104, or used as input to a voice-to-text transcription system that is used by persons A or C, or for transmission to another individual that is participating in the conversation remotely.

An example modeling of the process for enhancing audio using multiple recording devices models each input signal, $X_i$, as a combination of speaker signal, $S_i$, and per phone local noise: $X_i = S_i + N_i$ A general form for $N_i$ can be written as: $N_i = \Sigma_k w_{ik} M_k + \Sigma_{j \neq i} u_{ij} S_j$ where Mk are the common noise sources and $S_j$ are the other speakers. w and u are weights. However it can be helpful to simplify this expression for two cases.

In case 1, there is no other phone close to source i. In this case, $N_i$ is "pure noise" and can be decomposed as: $N_i = \Sigma_k w_{ik} M_k$ wherein $M_k$ are the common noise sources for all nearby phones, but each phone "experiences" them with different set of weights $w_{ik}$. The solution can recover these weights. By assuming that the noise sources are not correlated with the speech signal and that there are sufficient "good neighbors" for each source, PCA can be employed as a decomposition algorithm, as detailed below. A "good neighbor" in this case may be one that experiences similar noise factors (but can have different weights).

In case 2, there are phones that are close to source i. In this case we may assume they experience the same background noise, N. If, for example, phones 2 and 3 are close to phone 1, we may rewrite the model: $N_i = w_i N + \Sigma_{k=2,3} u_{ik} S_k$. In this case PCA can be employed again to recover the weights but this time all but one dominant part may be treated as signals instead of noise. The noise part may be obtained from the mean. Now that the sources locations are known, the cases can be distinguished.

The instantaneous means and correlations can be calculated. For each input signal the computing system may compute an F (e.g, 256) bins STFT vector over 25 ms time intervals every 10 ms, and the magnitude may be computed for each frequency bin. A correlation matrix, Ci of size F×F and mean vector, Mi, of size F, may be maintained, for each recording device. Ci holds feature correlation of all the phones in a radius of up to 20 meters from the speaker. Mi holds the mean feature vector of these phones. (20 meters might be replaced by 2 in some situations as described below). This matrices will be used to estimate Si.

Si can be calculated from Ci (in frequency domain). To a first approximation $M_i$ is subtracted from $X_i$ (in the spectral domain) to remove the first factor which may be assumed to be common noise uncorrelated to the speech.

In a first case in which there are no "close neighbors" and all phones are at least 2 meters away from the source. In this case the most dominant correlation between phones may be related to noise. Thus we can subtract the strongly correlated part from $X_i$. If we have K phones in the vicinity of $X_i$ we can identify up to K1 noise factors impacting it. The estimate of $S_i$ (in spectral domain) may be obtained by projecting (the STFT of) $X_i$ on the space orthogonal to the first few dominant eigenvectors of $C_i$, using the PCA algorithm. Note that since $M_i$ was already subtracted this is a simple linear transformation. The exact number of eigenvectors can be chosen according the magnitude of the eigenvalues and may determine how many common noise factors are to be eliminated.

In a second case in which there is "crosstalk" and some phones are 2 meters or less from source. "Crosstalk" may be a situation in which two speakers are less than 2 meters from each other and the voice of one speaker might be perceived as noise by the other. In this case, multi-microphone source separation algorithms other than PCA may be used, such a Non-negative Matrix Factorization (NMF). In this case, "close neighbors" may be exposed to the same noise conditions other than the mutual interference. In this situation only the close neighbors may be included in $C_i$ and $M_i$. Assuming there are K such neighbors, the PCA may project on the first K eigenvectors as these now represent signal and not noise. Some of the subspaces might be contain noise if a speaker is momentarily silent. This may be corrected by not projecting across dimensions that have too much correlation (and represent common noise).

Going back to the time domain, to move the estimated $S_i$ back to the time domain, the inverse short-time Fourier transformation can be computed. Phase estimation algorithms can be used to reconstruct the phase and improve the speech quality.

Further to the descriptions above, a user may be provided with controls allowing the user to make an election as to both if and when systems, programs or features described herein may enable collection of user information (e.g., a user's current location, a user's voice information, an ability for a device to record audio with or without a prompt), and if the user is sent content or communications from a server. In addition, certain data may be treated in one or more ways before it is stored or used, so that personally identifiable information is removed. For example, a user's identity or audio models may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 4:
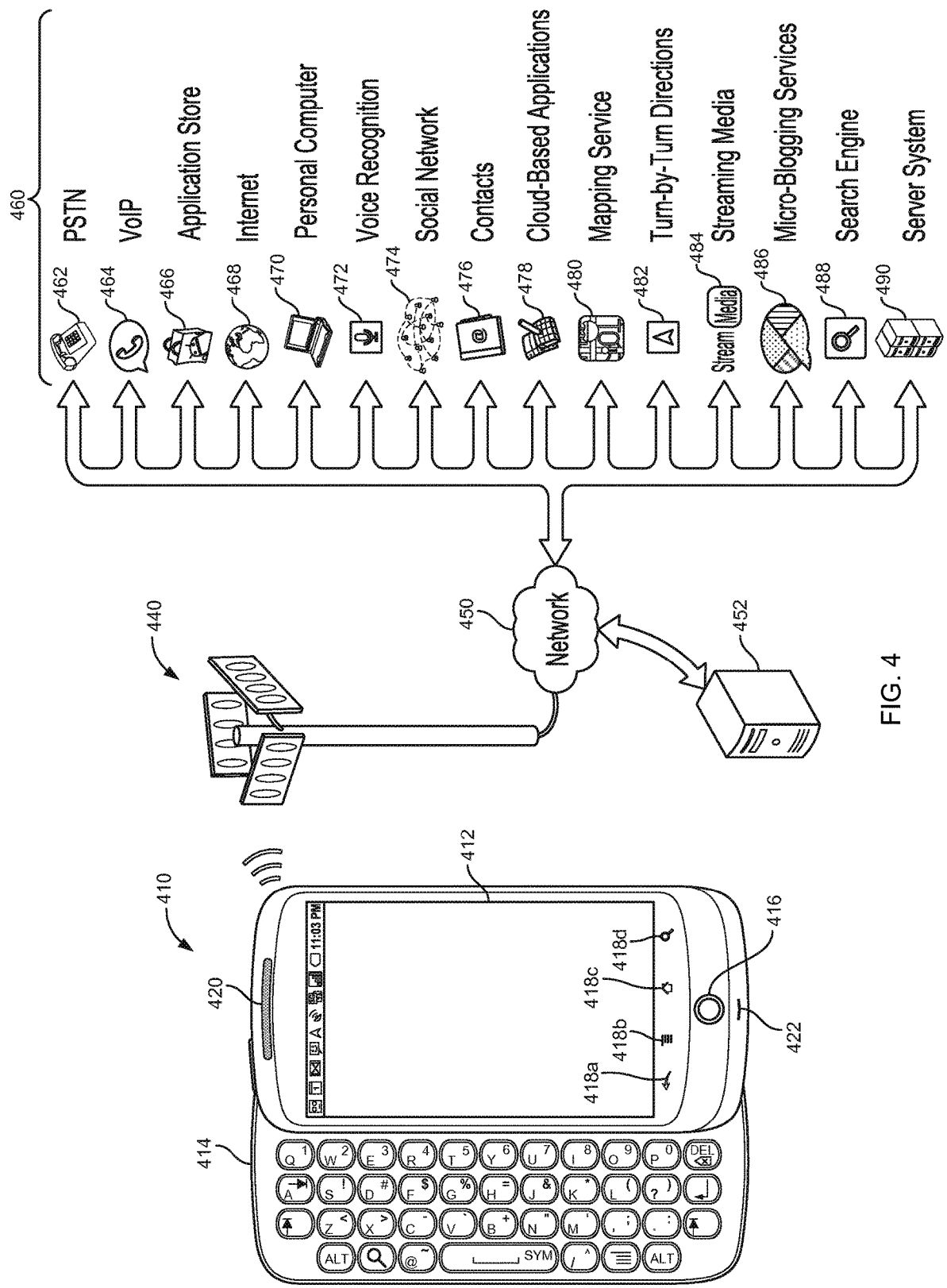
FIG. 4 shows a conceptual diagram of a system that may be used to implement the systems and methods described in this document.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or an application telephone) that includes a touchscreen display device 412 for presenting content to a user of the mobile computing device 410 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 414, physical buttons, trackballs, accelerometers, gyroscopes, and magnetometers).

Example visual output mechanism in the form of display device 412 may take the form of a display with resistive or capacitive touch capabilities. The display device may be for displaying video, graphics, images, and text, and for coordinating user touch input locations with the location of displayed information so that the device 410 can associate user contact at a location of a displayed item with the item. The mobile computing device 410 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a track pad enables the user to supply directional and rate of movement information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" graphical user interface that is displayed after turning on the mobile computing device 410, after activating the mobile computing device 410 from a sleep state, after "unlocking" the mobile computing device 410, or after receiving user-selection of the "home" button 418c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 410 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 410 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 410. The mobile device 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., ETHERNET, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computing systems that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing systems associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call using a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 5:
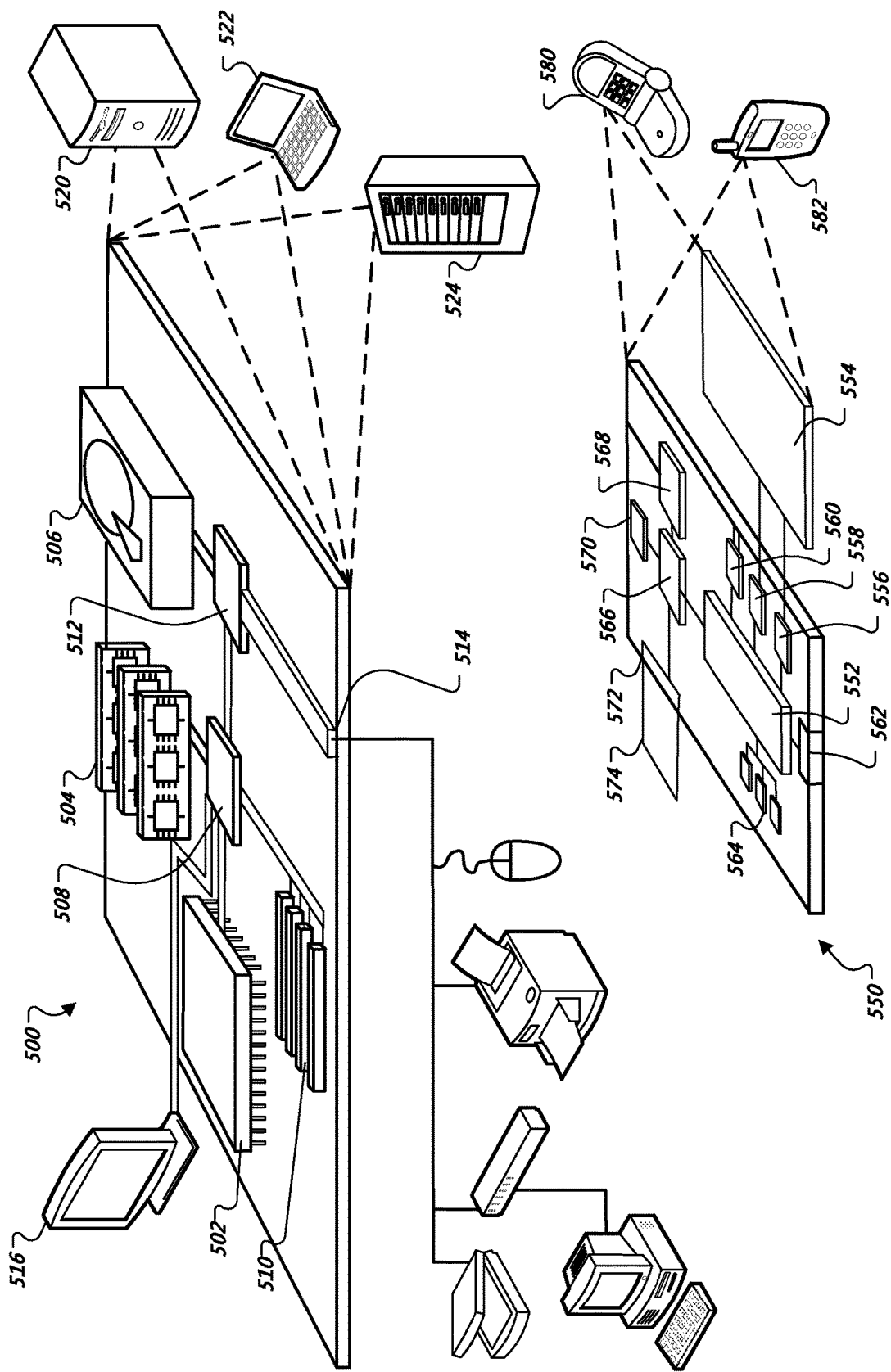
FIG. 5 shows a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provided, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for enhancing audio, the method comprising:
   receiving, using a hardware processor, an audio stream for playback on a media device;
   extracting, using the hardware processor, a first audio source, a second audio source, and a third audio source from the audio stream;
   determining, using the hardware processor, that a conversation between the first audio source and the second audio source occurs within a first portion of the audio stream and a second conversation between the first audio source and the third audio source occurs within a second portion of the audio stream at a second time point; and
   generating, using the hardware processor, an updated audio stream that enhances the first audio source and the second audio source extracted from the first portion of the audio stream and diminishes the third audio source extracted from the first portion of the audio stream and that enhances the first audio source and the third audio source extracted from the second portion of the audio stream and diminishes the second audio source extracted from the second portion of the audio stream.

2. The computer-implemented method of claim 1, further comprising receiving a second audio stream for playback on the media device, wherein the conversation between the first audio and the second audio source is determined to occur within the audio stream and the second audio stream and wherein the update audio stream is generated by enhancing the first audio source from the audio stream, the first audio source from the second audio stream, the second audio source from the audio stream, and the second audio source from the second audio stream and diminishing the third audio source from the audio stream and the third audio source from the second audio stream.

3. The computer-implemented method of claim 2, wherein a first ratio of an amplitude of the first audio source in the audio stream to the second audio source in the audio stream is different than a second ratio of an amplitude of the first audio source in the second audio stream to the second audio source in the second audio stream.

4. The computer-implemented method of claim 3, wherein a third ratio of the first audio source in the updated audio stream to the second audio source in the updated audio stream is different than the first ratio and the second ratio.

5. The computer-implemented method of claim 1, further comprising:
   receiving a second audio stream for playback on the media device;
   determining that a third conversation between the third audio source and a fourth audio source occurs within the second audio stream; and
   generating a second updated audio stream that enhances the third audio source and the fourth audio source extracted from the second audio stream and diminishes the first audio source and the second audio source from the second audio stream.

6. The computer-implemented method of claim 1, wherein the first audio source, the second audio source, and the third audio source are extracted from the audio stream by decomposing the audio stream into a first audio portion in which the first audio source is speaking, a second audio portion in which the second audio source is speaking, and a third audio portion in which the third audio source is speaking.

7. The computer-implemented method of claim 1, further comprising transmitting the updated audio stream to the media device while inhibiting the transmission of the updated audio stream to a second media device.

8. A system for enhancing audio, the system comprising:
a hardware processor that:
receives an audio stream for playback on a media device;
extracts a first audio source, a second audio source, and a third audio source from the audio stream;
determines that a conversation between the first audio source and the second audio source occurs within a first portion of the audio stream and a second conversation between the first audio source and the third audio source occurs within a second portion of the audio stream at a second time point; and
generates an updated audio stream that enhances the first audio source and the second audio source extracted from the first portion of the audio stream and diminishes the third audio source extracted from the first portion of the audio stream and that enhances the first audio source and the third audio source extracted from the second portion of the audio stream and diminishes the second audio source extracted from the second portion of the audio stream.

9. The system of claim 8, wherein the hardware processor also receives a second audio stream for playback on the media device, wherein the conversation between the first audio and the second audio source is determined to occur within the audio stream and the second audio stream and wherein the update audio stream is generated by enhancing the first audio source from the audio stream, the first audio source from the second audio stream, the second audio source from the audio stream, and the second audio source from the second audio stream and diminishing the third audio source from the audio stream and the third audio source from the second audio stream.

10. The system of claim 9, wherein a first ratio of an amplitude of the first audio source in the audio stream to the second audio source in the audio stream is different than a second ratio of an amplitude of the first audio source in the second audio stream to the second audio source in the second audio stream.

11. The system of claim 10, wherein a third ratio of the first audio source in the updated audio stream to the second audio source in the updated audio stream is different than the first ratio and the second ratio.

12. The system of claim 8, wherein the hardware processor also:
receives a second audio stream for playback on the media device;
determines that a third conversation between the third audio source and a fourth audio source occurs within the second audio stream; and
generates a second updated audio stream that enhances the third audio source and the fourth audio source extracted from the second audio stream and diminishes the first audio source and the second audio source from the second audio stream.

13. The system of claim 8, wherein the first audio source, the second audio source, and the third audio source are extracted from the audio stream by decomposing the audio stream into a first audio portion in which the first audio source is speaking, a second audio portion in which the second audio source is speaking, and a third audio portion in which the third audio source is speaking.

14. The system of claim 8, wherein the hardware processor also transmits the updated audio stream to the media device while inhibiting the transmission of the updated audio stream to a second media device.

15. A non-transitory computer-readable medium comprising computer-executable instructions that, when executed by a processor, cause the processor to perform a method for enhancing audio, the method comprising:
receiving an audio stream for playback on a media device;
extracting a first audio source, a second audio source, and a third audio source from the audio stream;
determining that a conversation between the first audio source and the second audio source occurs within a first portion of the audio stream and a second conversation between the first audio source and the third audio source occurs within a second portion of the audio stream at a second time point; and
generating an updated audio stream that enhances the first audio source and the second audio source extracted from the first portion of the audio stream and diminishes the third audio source extracted from the first portion of the audio stream and that enhances the first audio source and the third audio source extracted from the second portion of the audio stream and diminishes the second audio source extracted from the second portion of the audio stream.

16. The non-transitory computer-readable medium of claim 15, wherein the method further comprises receiving a second audio stream for playback on the media device, wherein the conversation between the first audio and the second audio source is determined to occur within the audio stream and the second audio stream and wherein the update audio stream is generated by enhancing the first audio source from the audio stream, the first audio source from the second audio stream, the second audio source from the audio stream, and the second audio source from the second audio stream and diminishing the third audio source from the audio stream and the third audio source from the second audio stream.

17. The non-transitory computer-readable medium of claim 16, wherein a first ratio of an amplitude of the first audio source in the audio stream to the second audio source in the audio stream is different than a second ratio of an amplitude of the first audio source in the second audio stream to the second audio source in the second audio stream.

18. The non-transitory computer-readable medium of claim 17, wherein a third ratio of the first audio source in the updated audio stream to the second audio source in the updated audio stream is different than the first ratio and the second ratio.

19. The non-transitory computer-readable medium of claim 15, wherein the method further comprises:
receiving a second audio stream for playback on the media device;

determining that a third conversation between the third audio source and a fourth audio source occurs within the second audio stream; and generating a second updated audio stream that enhances the third audio source and the fourth audio source extracted from the second audio stream and diminishes the first audio source and the second audio source from the second audio stream.

20. The non-transitory computer-readable medium of claim 15, wherein the first audio source, the second audio source, and the third audio source are extracted from the audio stream by decomposing the first audio stream and the second audio stream into a first audio portion in which the first audio source is speaking, a second audio portion in which the second audio source is speaking, and a third audio portion in which the third audio source is speaking.

21. The non-transitory computer-readable medium of claim 15, wherein the method further comprises transmitting the updated audio stream to the media device while inhibiting the transmission of the updated audio stream to a second media device.

* * * * *